United States Patent [19]

Hitomi et al.

[11] Patent Number: 5,138,839
[45] Date of Patent: Aug. 18, 1992

[54] CONTROL SYSTEM FOR INTERNAL COMBUSTION ENGINE WITH TURBO SUPERCHARGER

[75] Inventors: Mitsuo Hitomi, Hiroshima; Toshio Nishikawa, Fuji; Nobuo Takeuchi, Hiroshima, all of Japan

[73] Assignee: Mazda Motor Corporation, Hiroshima, Japan

[21] Appl. No.: 540,485

[22] Filed: Jun. 19, 1990

[30] Foreign Application Priority Data

Jun. 20, 1989 [JP] Japan .................... 1-157740

[51] Int. Cl.$^5$ .................... F02B 37/12
[52] U.S. Cl. .................... 60/602; 60/605.1; 123/52 M
[58] Field of Search .......... 60/602, 611, 605.1; 623/52 M, 1 MB, 1 MV, 559.3, 564

[56] References Cited

FOREIGN PATENT DOCUMENTS

| 0203590 | 12/1986 | European Pat. Off. . |
| 2615902 | 12/1988 | France . |
| 41425 | 3/1982 | Japan .................... 60/602 |
| 075721 | 9/1985 | Japan . |
| 104717 | 10/1985 | Japan . |
| 66824 | 4/1986 | Japan .................... 60/602 |
| 001836 | 5/1986 | Japan . |
| 119624 | 5/1990 | Japan .................... 123/559.1 |

Primary Examiner—Michael Koczo
Attorney, Agent, or Firm—Fleit, Jacobson, Cohn, Price, Holman & Stern

[57] ABSTRACT

A control system for an engine with a turbo supercharger includes a first switching device for switching an introduction of intake gas to the engine in accordance with engine speed between a first intake condition, in which a charging efficiency of the intake gas is improved in a lower engine speed condition, and a second intake condition, in which the charging efficiency of the intake gas is improved in a higher engine speed condition. The control system also includes a second switching device for switching a maximum supercharging pressure of the turbo supercharger from a lower pressure to a higher pressure in response to a switching operation between the first intake condition and the second intake condition. An improved charging efficiency of the intake gas can be obtained in a broader range of the engine speeds reducing the maximum supercharging pressure of the intake gas, thereby preventing knocking of the engine.

14 Claims, 7 Drawing Sheets

CONTROL SYSTEM FOR INTERNAL COMBUSTION ENGINE WITH TURBO SUPERCHARGER

BACKGROUND OF THE INVENTION

1. Field of the Invention

The present invention relates to a control system for an internal combustion engine with a turbo supercharger, and more specifically, to a control system for an intake system for the engine.

2. Description of the Prior Art

There has been known a dynamic supercharger utilizing a pressure oscillation or resonance effect provided by intake gas, a valve timing control device for controlling valve timings of intake and/or exhaust valves and a mechanical and turbo super charger which improves intake gas charging efficiency. Further, it is also known to provide a first intake condition in which the engine is controlled to improve the intake gas charging efficiency in a lower engine speed condition and a second intake condition in which the engine is controlled to improve the intake gas charging efficiency in a higher engine speed condition. The first and second intake conditions are selectively established in accordance with the engine speed to obtain an improved intake gas charging efficiency over a greater range of the engine speeds. In addition, it has been proposed to combine two or more the above control systems for further improving the intake gas efficiency. For example, Japanese Patent Public Disclosure No. 59-164408, laid open to the public in 1984, discloses an engine provided with both the turbo supercharger and the dynamic supercharger.

In an engine with a turbo supercharger, it is desirable to suppress an excessive increase of the supercharging pressure of the intake gas in the lower engine speed condition in order to prevent knocking. It should, however, be noted that there is no conventional engine with both a turbo supercharger and another system for improving the charging efficiency of the intake gas which can improve the charging efficiency, preventing the knocking of the engine, in a broader range of engine operating conditions.

SUMMARY OF THE INVENTION

It is, therefore, a primary object of the present invention to provide a control system which can improve the charging efficiency, preventing knocking of the engine, in a broader range of the engine operating conditions.

It is another object of the present invention to provide an engine provided with both the turbo supercharger and a system other than the turbo supercharger for improving the intake gas charging efficiency which can improve the charging efficiency, preventing the knocking of the engine, in the broader range of the engine operating conditions.

According to the present invention, in order to accomplish the above and other objects, there is provided a control system for an engine with a turbo supercharger comprising a first switching device for switching an introduction of intake gas to the engine in accordance with engine speed between a first intake condition in which a charging efficiency of the intake gas is improved in a lower engine speed condition and a second intake condition in which the charging efficiency of the intake gas is improved in a higher engine speed condition, and a second switching device for switching a maximum supercharging pressure of the turbo supercharger from a lower pressure to a higher pressure in response to a switching operation between the first intake condition and second intake condition.

According to a preferred embodiment of the present invention, the first switching device can be a variable intake device which switches a natural frequency of an intake system of the engine to tune specific engine speeds or a valve timing control device which changes an opening and closing timing of an intake valve.

In a further embodiment of the present invention, the first switching device includes both the variable intake device and the valve timing control device. The valve timing control device changes the introduction of the intake gas from the first intake condition to the second intake condition at an engine speed lower than an engine speed at which the variable intake device changes the introduction of the intake gas from the first to second intake conditions.

In still another preferred embodiment, the first switching device can be a volume changing device for changing a volume of the turbo supercharger.

According to the present invention, a high charging efficiency of the intake gas can be maintained over a broader range of the engine speeds reducing the maximum supercharging pressure of the intake gas, thereby preventing knocking of the engine.

The above and other features of the present invention will become apparent from the following description of the preferred embodiments which make reference to the accompanying drawings.

DESCRIPTION OF THE PREFERRED EMBODIMENTS

Figure 1:
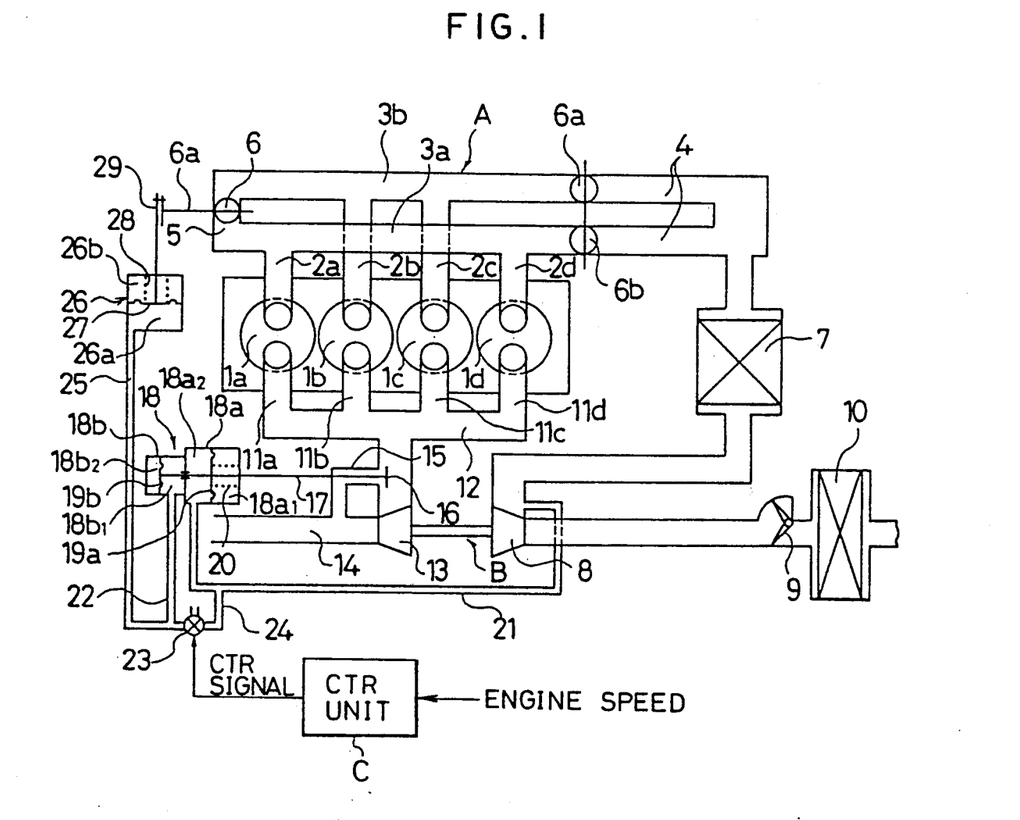
FIG. 1 is a schematic view of an intake and exhaust system of a four-cylinder engine with a resonance supercharging system and a turbo supercharger in accordance with a preferred embodiment of the present invention.

Referring to FIG. 1, a four-cylinder engine A in accordance with the present invention is provided with a first, second, third and fourth cylinders 1a, 1b, 1c and 1d, respectively, from one end of the engine A in a longitudinal direction thereof. An ignition occurs in the first, second, third and fourth cylinders 1a, 1c, 1d and 1b, in that order. Intake ports of the first through fourth cylinders 1a-1d are connected with independent intake passages 2a-2d. The independent intake passages 2a and 2d of the first and fourth cylinders 1a and 1d, in which intake strokes do not take place continuously, are connected with a merged intake passage 3a. Likewise the independent intake passages 2b and 2c of the second and third cylinders 1b and 1c in which intake strokes do not take place continuously, are connected with another merged intake passage 3b. The merged intake passages 3a and 3b are communicated with each other through a communicating passage 4 at an upstream end and through a communicating passage 5 shorter than the communicating passage 4 at a downstream end. The downstream communicating passage 5 is provided with a variable intake valve 6. In an upstream portion of the merged intake passages 3a and 3b are disposed throttle valves 6a and 6b. A dimension of the upstream communicating passage 4 is so determined that an intake structure constituted by the independent intake passages 2a-2d, the merged intake passages 3a and 3b and the communicating passage 4 provides a resonance supercharging effect around an engine speed n·. The dimension of the downstream communicating passage 5 is so determined that an intake structure constituted by the independent intake passages 2a-2d, the merged intake passages 3a and 3b and the communicating passage 5 produces a resonance supercharging effect around an engine speed $n_1$, wherein the engine speed $n_1$ is greater than the engine speed n·.

The upstream portion of the communicating passage 4 is communicated with a compressor 8 of a turbo-supercharger B through an intercooler 7 for cooling supercharged air. In an upstream side of the compressor 8, the passage 4 is communicated with an air flow meter 9 and an air cleaner 10.

Exhaust ports of the first through fourth cylinders 1a-1d are communicated with a merged exhaust passage 12. A downstream portion of the merged exhaust passage 12 is communicated with an exhaust passage 14 through a turbine of the turbo supercharger B. There is provided a bypass passage bypassing the turbine 13. The bypass passage 15 is provided with a waste gate valve 16 therein for controlling an amount of exhaust gas introduced into the turbine 13. The waste gate valve 16 is connected with an actuator 18 through a rod 17 to be opened and closed.

The actuator 18 is provided with a large cylindrical portion 18a and a small cylindrical portion 18b. The large cylindrical portion 18a and the small cylindrical portion 18b are partitioned by diaphragms 19a and 19b to define chambers $18a_1$, $18a_2$, $18b_1$ and $18b_2$ respectively. A spring 20 is disposed in the chamber $18a_1$, for urging the diaphragm 19a toward the chamber $18a_2$. The chambers $18a_1$ and $18b_2$ are opened to the atmosphere. The rod 17 is fixed to the waste gate valve 16 and the diaphragms 19a, 19b and passes through an opening of the chamber $18a_1$ through which the chamber $18a_1$ is communicated with the atmosphere and an opening on a partition wall between the chambers $18a_2$ and $18b_1$. In this case, a sealing member is arranged to plug the opening of the partition wall to keep the partition wall airtight. The chamber $18a_2$ of the large cylindrical portion 18a is communicated with the intake passage just downstream of the compressor 8 through a communicating passage 21. The chamber $18b_1$ of the small cylindrical portion 18b is communicated with the communicating passage 21 through a communicating passage 22, a three-way solenoid 23 and a communicating passage 24. The three-way solenoid 23 is communicated with a chamber 26a of an actuator for the variable intake control valve 6 through a communicating passage 25 which is separated from the communicating passage 22. The chamber 26a is formed adjacent to a chamber 26b through a diaphragm 27. There is provided a spring 28 in the chamber 26b for urging the diaphragm 27 toward the chamber 26a. The chamber 26b is opened to the atmosphere. A rod 29, joined with the diaphragm 27 at one end, is extended through an opening communicated with the atmosphere. The other end of the rod 29 is connected with a rotation shaft 6a of the variable intake control valve 6 through an appropriate rotation mechanism.

The three-way solenoid 23 is so constituted as to take a first operating position, in which the communicating passages 22 and 25 are opened to the atmosphere and the communicating passage 24 is closed and a second operating position, in which the communicating passages 22 and 25 are communicated with the communicating passage 24 and the communicating passage 24 is opened. The three-way solenoid 23 is controlled by a control unit C, which is provided with memory storing a control program, an input and output interface, and a CPU. The control unit C receives a signal from an engine speed sensor and produces a control signal to the three-way solenoid 23.

Figure 2:
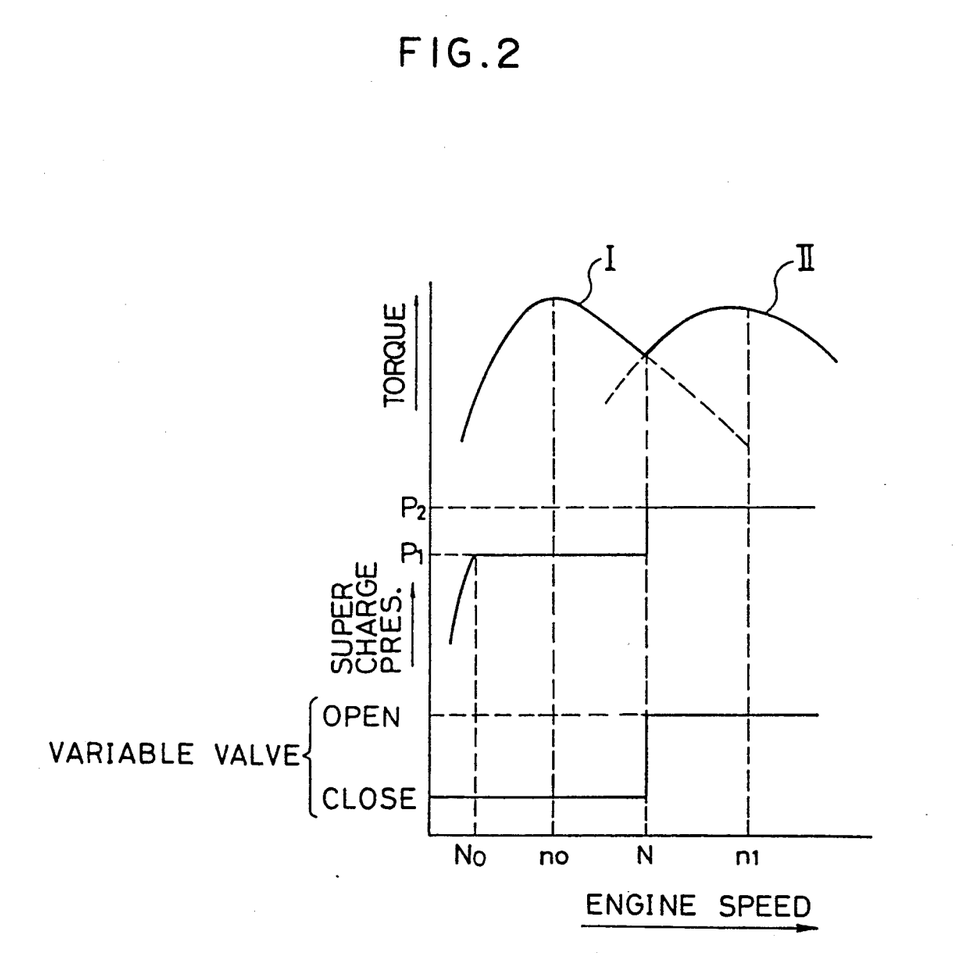
FIG. 2 is a graphical representation showing a relationship of engine speed, maximum supercharging pressure and engine torque.

In operation, in an engine operating range of a lower engine speed in which the engine speed is lower than a predetermined engine speed N ($n_1 > N > n·$), the three-way solenoid is maintained at the first operating position. In this condition, the chamber 26a of the actuator 26 is opened to the atmosphere so that the diaphragm 27 is displaced toward the chamber 26a due to a resilient force of the spring 28. The displacement of the diaphragm 27 is transmitted to the rod 29, which is joined with the diaphragm 27, to the rotation shaft 6a through the rotation mechanism and to the variable intake control valve 6 so that the variable intake valve 6 closes the communicating passage 5. Thus, the intake system for the resonance effect of the intake gas is constituted by the independent passages 2a-2d, the merged passages 3a and 3b, and the communicating passage 4, wherein the resonance effect is obtained around the engine speed n· to improve the intake gas charging efficiency. As a result, the engine torque changes along a curved line I to take a peak value as shown in FIG. 2 (first intake condition).

In a condition in which the engine is stopped, the diaphragm 19a of the actuator 18 is displaced toward the chamber $18a_2$ due to a resilient force of the spring 20. The displacement of the diaphragm 19a is transmitted to the waste gate valve 16 through the rod 17 fixed to the diaphragm 19a so that the waste gate valve 16 closes the bypass passage 15.

As the engine speed is increased after engine is started, the supercharging pressure of the turbo supercharger B increases. When the engine speed is greater than a predetermined value N· (N· < N), a force urging the diaphragm 19a toward the chamber $18a_1$, due to the supercharging pressure $P_1$ introduced from the intake passage downstream of the compressor 8 into the chamber $18a_2$ through the communicating passage 21 overcomes the resilient force of the spring 20 urging the diaphragm 27 toward the chamber $18a_2$ so that the waste gate valve 16 is opened to open the bypass passage 15. Thus, the supercharging pressure of the turbo supercharger B increases until the engine speed reaches the predetermined value N·. When the supercharging pressure reaches a value $P_1$, that is, the engine speed reaches the value N·, the waste gate valve 16 is opened to suppress the increase of the supercharging pressure. As a result, the supercharging pressure is maintained at the value $P_1$ even when the engine speed increases beyond the value N·.

When the engine speed is increased to reach the predetermined value $N_1$, the control unit judges the engine speed N based on the engine speed signal, and produces a control signal to the three-way solenoid 23 in order to establish the second operating position.

The supercharging pressure $P_1$ from the intake passage downstream of the compressor 8 is introduced into the chamber $26a$ of the actuator 26 through the communicating passages 21, 24 and 25 The pressure $P_1$ in the chamber $26a$ urges the diaphragm 27 toward the spring 28. The force due to the pressure $P_1$ overcomes the resilient force of the spring 28 so that the variable intake control valve 6 opens the communicating passage. As a result, an intake system for the resonance effect of the intake gas constituted by the independent intake passages $2a$-$2d$ the merged intake passages $3a$ and $3b$ is established to provide the resonance effect of the intake gas around the engine speed $n_i$. Thus, the charging efficiency of the intake gas is improved around the engine speed $n_1$ and the engine torque exerted by the engine changes along a curved line II as shown in FIG. 2 to take a peak value (second intake condition).

On the other hand, the supercharging pressure $P_1$ is also introduced into the chamber $18b_1$ of the actuator 18 from the intake passage downstream of the compressor 8 through the communicating passages 21, 24 and 22. A force is produced due to the pressure $P_1$ urging the diaphragm $19b$ toward the chamber $18b_2$. A sum of the force due to the pressure $P_1$ and the resilient forces of the spring 20 urging the diaphragm $19b$ toward the chamber $18b_2$ overcome the force due to the pressure $P_1$ introduced into the chamber $18a$, through the communicating passage 21 for urging the diaphragm $19a$ toward the spring 20 so that the waste gate valve 16 is actuated to close the bypass passage 15. As a result, the supercharging pressure is abruptly increased. It should, however, be noted that the diaphragm $19a$ is greater than the diaphragm $19b$ in area. Thus, the supercharging pressure reaches a value $P_2$ ($P_2 > P_1$), and the force, due to the pressure $P_2$ introduced into the chamber $18a_2$ to urge the diaphragm $19a$ to compress the spring 20, overcomes the sum of the forces due to the pressure $P_2$ introduced into the chamber $18b_1$ and the resilient force of the spring 20 so that the waste gate valve 16 is actuated to open the bypass passage 15.

As a result, the supercharging pressure is abruptly increased from the value $P_1$ to $P_2$ when the engine speed reaches N. Then the supercharging pressure is maintained at the value $P_2$.

As aforementioned, according to the illustrated embodiment, the variable intake control is switched between the closed and opened position and the waste gate valve 16 takes the opened and closed position to change the maximum value of the supercharging pressure in accordance with the engine speed. As a result, a high charging efficiency of the intake gas can be obtained in a broader range of the engine speeds preventing the knocking of the engine.

Figure 3:
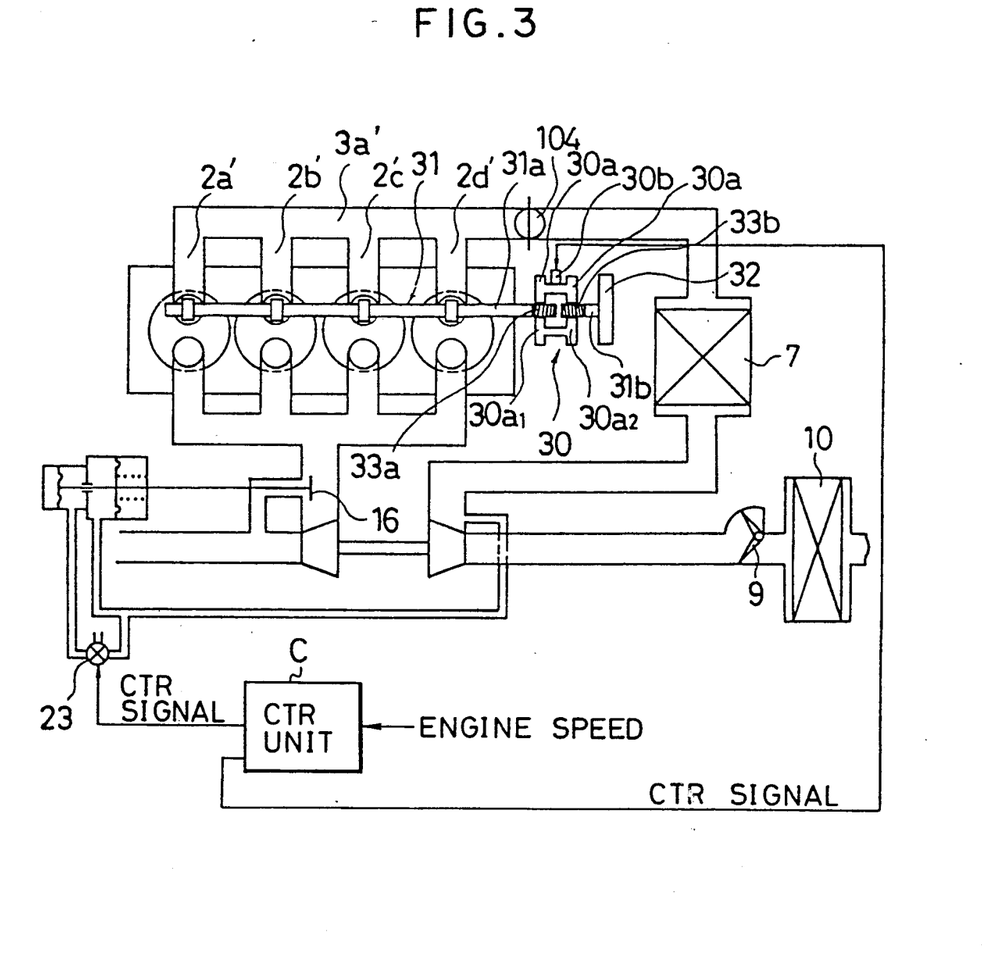
FIG. 3 is a schematic view of a four-cylinder engine with both a valve timing control device and a turbo supercharger similar to FIG. 1 but according to another embodiment.

Referring to FIG. 3, there is shown a four cylinder engine with a supercharger in accordance with another embodiment of the present invention.

The same elements are referred to by the same reference numerals in this and the former embodiment and a detailed explanation thereof will be omitted.

Independent intake passages $2a'$ through $2d'$ are connected to a merged intake passage $3a'$. There is provided an intake valve timing control device 30 for controlling an open and close timing of the intake valve. The control device 30 is provided with a cam shaft 31 for driving the intake valves, a sleeve $30a$ of a substantially H-shaped cross section incorporated into the cam shaft 31 and a drive lever $30b$ controlled by the control unit C. The cam shaft 31, is provided with a first portion $31a$ on which cam portions are formed and a second portion $31b$ connected with a pulley 32 which is driven by the crank shaft through a belt (not shown). The first portion $31a$ and second portion $31b$ are formed with helical splines $33a$ and $33b$ at first ends, respectively, facing each other but oriented opposite to each other. The sleeve $30a$ is formed with a pair of flange portions $30a_1$ and $30a_2$ which are formed with a threaded opening brought into engagement with the splines $33a$ and $33b$. The control unit C produces a control signal to the drive lever $30b$.

Figure 4:
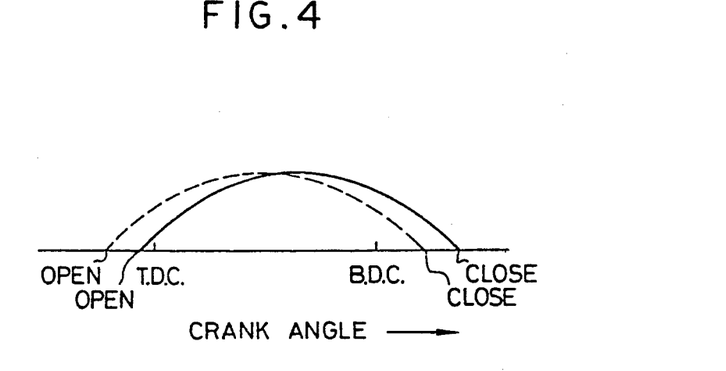
FIG. 4 is a graphical representation showing a change in an opening period of the intake valve.

With this structure, a relative angular relationship between the first portion $31a$ and the second portion $31b$ is so determined that the intake valve timing is advanced in a lower engine speed range (first intake condition). As a result, the charging efficiency of the intake gas is improved in the lower engine speed range and changes along a curved line I as shown in FIG. 2. When the engine speed is increased to reach a predetermined value, the control unit C produces a signal to the lever $30b$ so that the sleeve 30 is axially moved. Thus, the first portion $31a$ and second portion $31b$ of the cam shaft 31, both engaged with the flange $30a_1$, and $30a_2$ produce a relative rotative movement therebetween because Of the opposite orientation of the splines $33a$ and $33b$. As a result, the relative angular relationship between the cam shaft 31 and the crank shaft is changed to retard the valve timing as shown by the real line in FIG. 4, and the charging efficiency is improved in a higher engine speed range to change along a curved line II as shown in FIG. 2 (second intake condition).

On the other hand, on switching the valve timing from the advance timing to the retard timing, the control unit produces a control signal to the three-way solenoid 23 to switch the first operating position to the second operating position so that the waste gate valve 16 is closed to increase the maximum supercharging pressure.

As aforementioned, according to the illustrated embodiment, the intake valve timing control device 30 changes the valve timing of the intake valve to change the intake condition, changing the maximum supercharging pressure by controlling the waste gate valve 16. An improved charging efficiency of the intake gas can be maintained in a broader range of the engine speed, preventing the knocking of the engine.

Although the relative angular relationship between the cam shaft and the crank shaft is changed in the above embodiment to change the intake valve timing for changing the intake condition, a valve lift can be changed to obtain the same effect.

Figure 5:
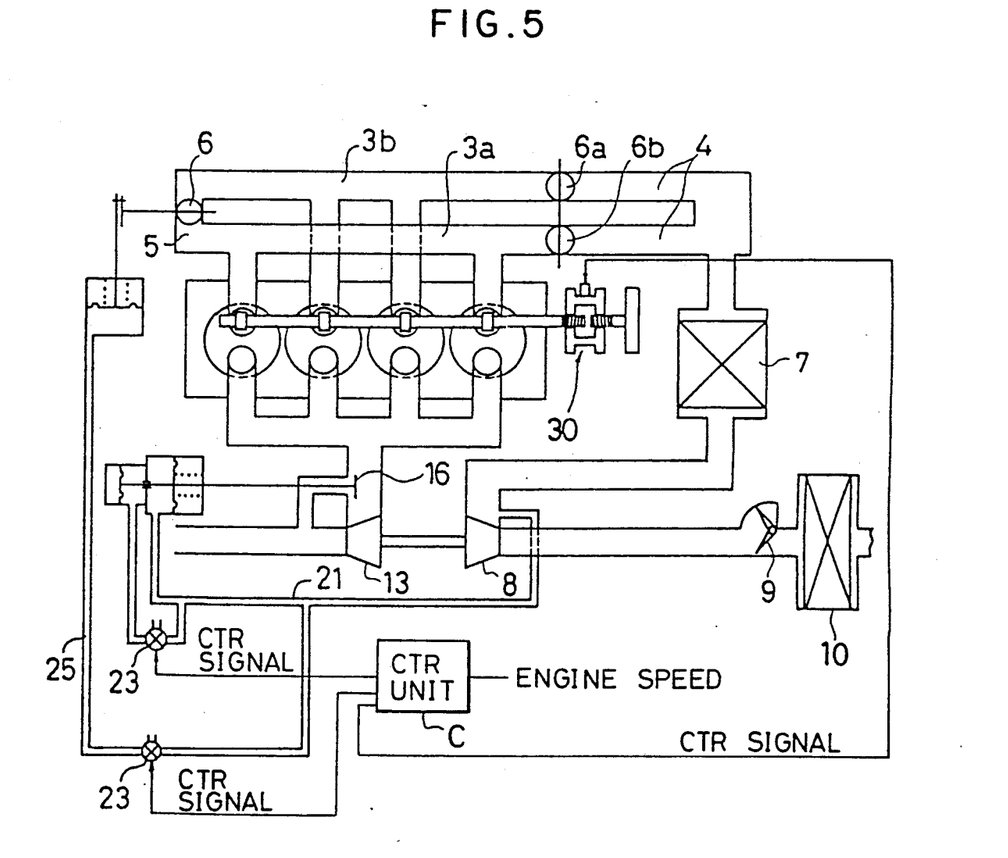
FIG. 5 is a schematic view of a four-cylinder engine with both a variable control device utilizing a resonance effect of the intake gas and the turbo supercharger similar to FIG. 1 but according to still another embodiment.

Referring to FIG. 5, there is shown a four cylinder engine with a turbo supercharger in accordance with a still further embodiment of the present invention. The illustrated engine is provided with the valve timing control device as explained in connection with FIG. 3 in addition to the resonance supercharger as explained in connection with the embodiment of FIG. 1. In this embodiment, the communicating passage 25 is not communicated with the communicating passage 22 but with the communicating passage 21 through a solenoid 23' which can receive the signal from the control unit C.

Figure 5A:
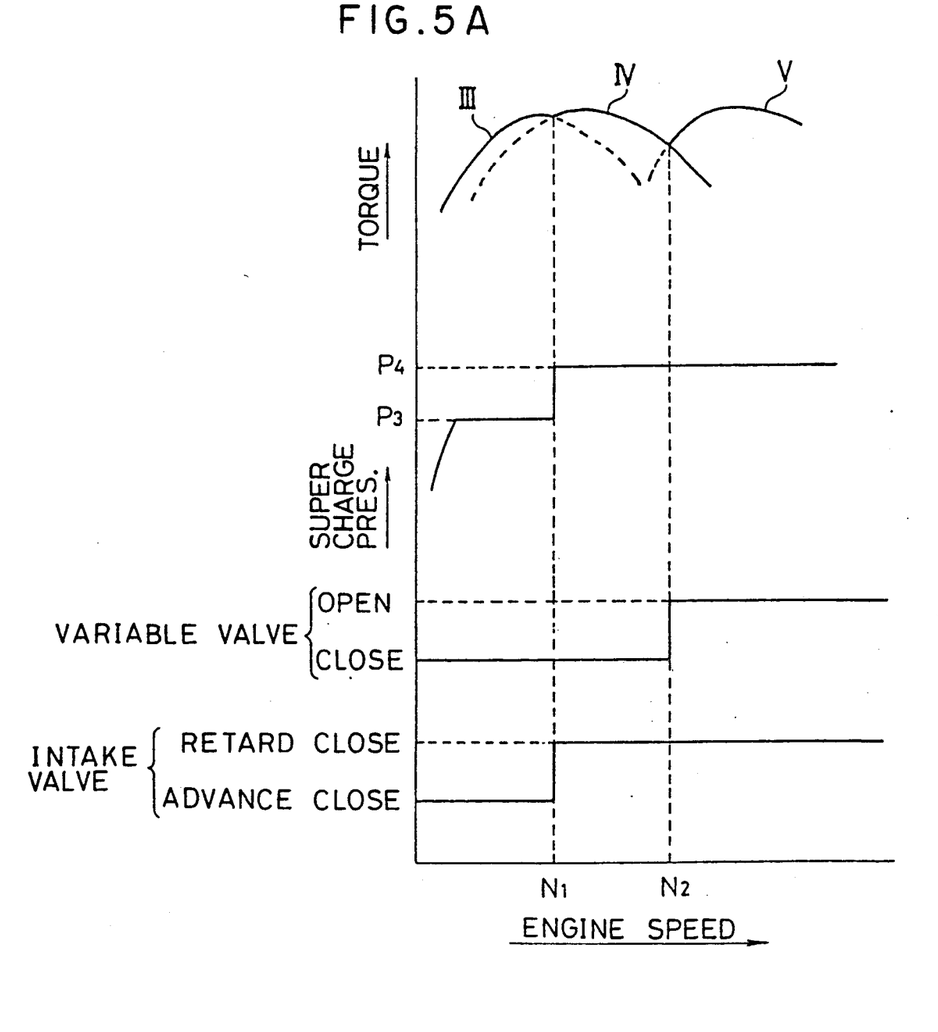
FIG. 5A is a graphical representation showing a relationship of engine speed, maximum supercharging pressure and engine torque similar to FIG. 2 but according to the embodiment of the FIG. 5.

According to the illustrated embodiment, at least in a higher engine load condition, when the engine speed exceeds a value N1, the control unit C controls the three-way solenoid 23 to take the second operating position from the first operating position and the timing control device 30 to retard the valve timing. When the engine speed exceeds a value N2 which is greater than the value N1, the solenoid is controlled to introduce the supercharging pressure into the communicating passage 25 for thereby opening the communicating passage by opening the variable valve 6. Thus, when the engine speed is lower than the value N1, the closing timing of the intake valve is advanced to improve the charging efficiency. When the engine speed is in range between the value N1 and N2, the closing timing of the intake valve is retarded to improve the charging efficiency. Further, when the engine speed exceeds the value N2, the resonance effect of the intake system, including the merged intake passage 3a and 3b and the communicating passage 5, can be obtained to improve the charging efficiency. As a result, the engine torque changes as shown by curved lines III (first intake condition), IV (second intake condition) and V (third intake condition) in FIG. 5A. When the engine speed is lower than the value N1, the supercharging pressure is maintained at a lower value $P_3$ so that knocking is suppressed effectively. Although the maximum supercharging pressure is increased to a value $P_4$ when the engine speed exceeds the value N1, the closing timing of the intake valve is retarded to reduce the compression ration of the intake gas to suppress knocking.

Figure 6:
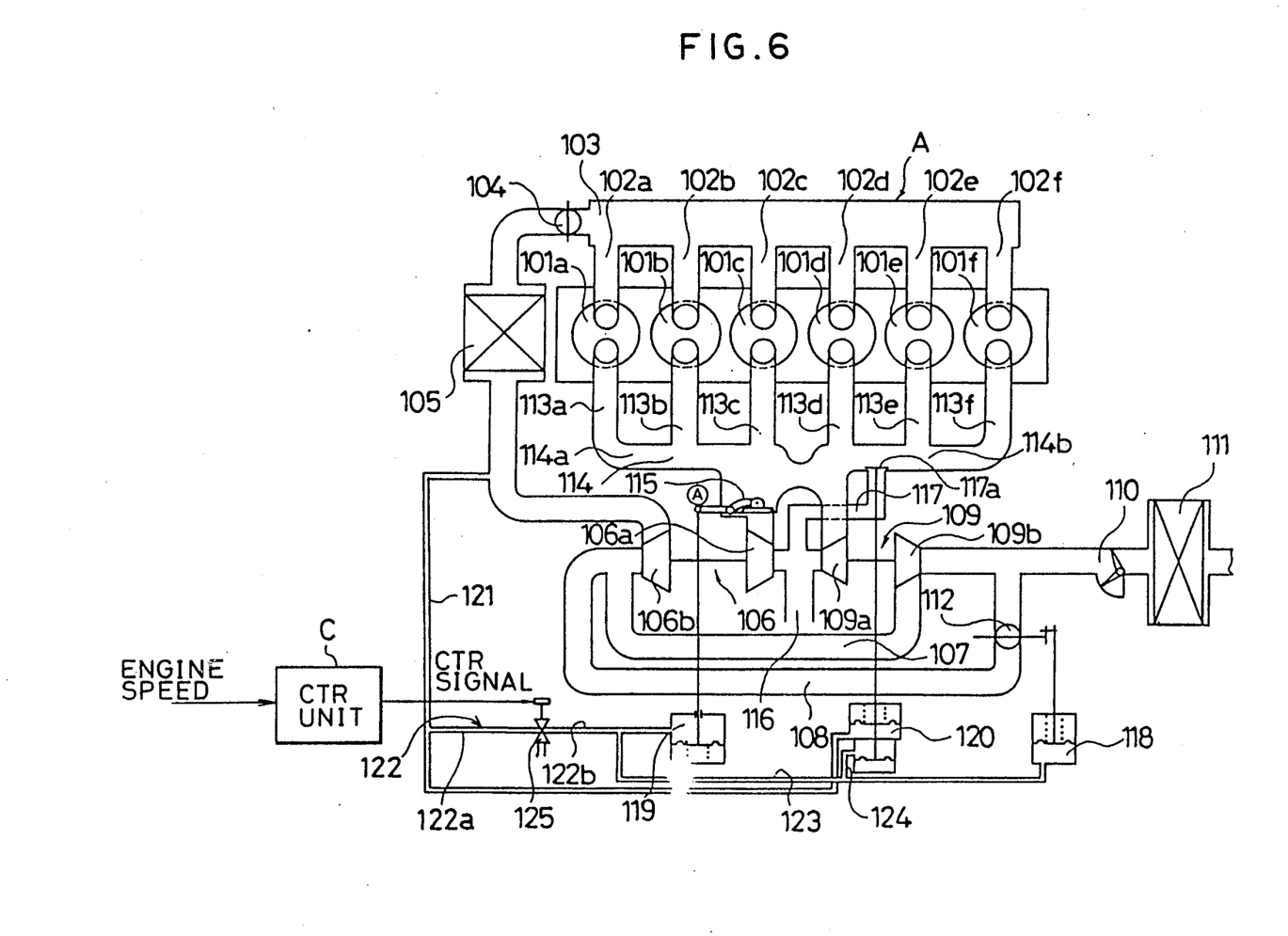
FIG. 6 is a schematic view of a four-cylinder engine with two turbo superchargers in accordance with yet another embodiment of the present invention.

Taking reference to FIG. 6, there is shown a six cylinder engine with a turbo supercharger in accordance with yet another embodiment of the present invention.

In FIG. 6, the engine A is provided with a first cylinder 101a, a second cylinder 101b, a third cylinder 101c, a fourth cylinder 101d, a fifth cylinder 101e and a sixth cylinder 101f, in this order, from one end thereof in a longitudinal direction.

The ignition takes place, in order, in the first cylinder 101a, the fifth cylinder 101e, the third cylinder 101c, the sixth cylinder 101f, the second cylinder 101b and the fourth cylinder 101d. Intake ports of the first through the sixth cylinders 101a-101f are connected with independent intake passages 102a-102f, which are connected to a merged intake passage 103. An upstream portion of the merged intake passage 103 is communicated with a compressor 106b of a first supercharger 106 through a throttle valve 104 and an intercooler 105. The intake passage upstream of the compressor 106b is biforked into two intake passages 107 and 108. The intake passage 107 is connected with a compressor 109b of a second compressor 109. The intake passage 107 is communicated with an air flow meter and an air cleaner 111. The intake passage 108 is communicated with the intake passage 107 upstream of the compressor 109b. The intake passage 108 is provided with a gate valve 112 to open and close the passage 108.

Exhaust ports of the first cylinder 101a—the sixth cylinder 101f are connected with a merged exhaust passage 114 through independent passages 113a-113f. The merged exhaust passage 114 is formed with a reduced portion between the independent passages 113c and 113d for preventing exhaust gas interference. Thus the merged exhaust passage 114 is divided by the reduced portion into a first merged exhaust passage 114a and a second merged exhaust passage 114b. The first merged exhaust passage 114a is communicated with a turbine 106a of the first supercharger 106. The second merged exhaust passage 114b is communicated with a turbine 109a of the second supercharger 109. There is provided a gate valve 115 in a joint portion between the first merged exhaust passage 114a and the turbine 106a. An exhaust passage portion downstream of the turbines 106a and 109a is connected with an exhaust passage 116. A waste gate valve 117a is disposed in a communicating portion between a bypass passage 117 and the second merged exhaust passage 114b.

In order to operate the gate valves 112 and 115, there are provided actuators 118 and 119. An actuator 120 is provided for operating the waste gate valve 117a. In order to take out the supercharging pressure for the actuators 118, 119 and 120, a communicating passage 121 is joined with the intake passage downstream of the compressor 106b of the first supercharger 106. A communicating passage 122, separated from the communicating passage 121, is connected with the actuator 119, and a communicating passage 123, separated from the communicating passage 122, is connected with the actuator 118. Further, a communicating passage 124, separated from the communicating passage 124, is connected with the actuator 120. At a portion of the communicating passage 122 upstream of a merged point with the communicating passage 123 is disposed a three-way solenoid valve 125, which takes a first position for closing an upstream portion 122a of the passage 122 upstream of the solenoid valve 125 and for releasing a downstream portion 122b of the passage downstream of the solenoid valve 125 to the atmosphere and a second position for communicating the upstream portion 122a with the downstream portion 122b. The three-way valve 125 is controlled by the control unit C.

In operation, when the engine is in a stopped condition or in a lower engine speed condition, wherein the engine speed is lower than a predetermined value, the control unit C keeps the three-way valve 125 at the first position. In this condition, the communicating passage 122b is opened to the atmosphere so that the actuators 118 and 119 keep the gate valves 112 and 115 at the closed positions because of the resilient force of springs disposed therein. The communicating passage 108 and the connection between the first merged passage 114a and the turbine 106a are interrupted. As a result, only the second supercharger 109 is operated to supercharge the intake gas. This causes a flow rate introduced into the turbine 109a to be increased to improve the charging efficiency of the intake gas in a lower engine speed condition (first intake condition). The engine torque changes along a curved line I as shown in FIG. 2. In this case, the actuator 120 is operated similarly to the actuator 12 as shown in FIG. 1 to maintain the maximum supercharging pressure at a predetermined low value.

When the engine speed is increased to the predetermined value, the control unit C provides the three-way solenoid valve 125 with a signal so that the three-way solenoid valve 125 takes the second position. Thus, the supercharging pressure is applied to the actuators 118 and 119 so that the gate valves 112 and 115 are released to open the communicating passage 108 and communicate the first merged passage 114a and the turbine 106a. As a result, in a higher engine speed condition, the exhaust gas is introduced into both the turbines 106a and 109a to supercharge the intake gas for improving the charging efficiency (second intake condition). The engine torque changes along the curved line II as shown in FIG. 2.

On the other hand, the actuator 120 is operated similarly to the actuator 18 to maintain the maximum supercharging pressure at the higher value.

According to the illustrated embodiment, the maximum value of the supercharging pressure utilizing the waste gate valve 117a is changed in accordance with the engine speed. Also, the intake condition of introduction of the intake gas is switched, utilizing the turbo superchargers 106 and 109 in accordance with the engine speed. As a result, the charging efficiency can be improved in a broader range of engine speeds, preventing knocking in a lower engine speed condition by maintaining the maximum supercharging pressure at a lower value in a low engine speed condition.

In a preferred control of the engine, the waste gate valve 117a is controlled so as to increase the maximum supercharging pressure of the intake gas in response to the switching operation of the condition of the introduction of the intake gas by means of the first and second superchargers 106 and 109 in order to suppress a torque shock resulting from the change in the intake condition of the intake gas. The increased value of the maximum supercharging pressure can be reduced to the usual maximum value as the engine speed is increased beyond the predetermined value at which the first intake condition is switched to the second intake condition.

Figure 7:
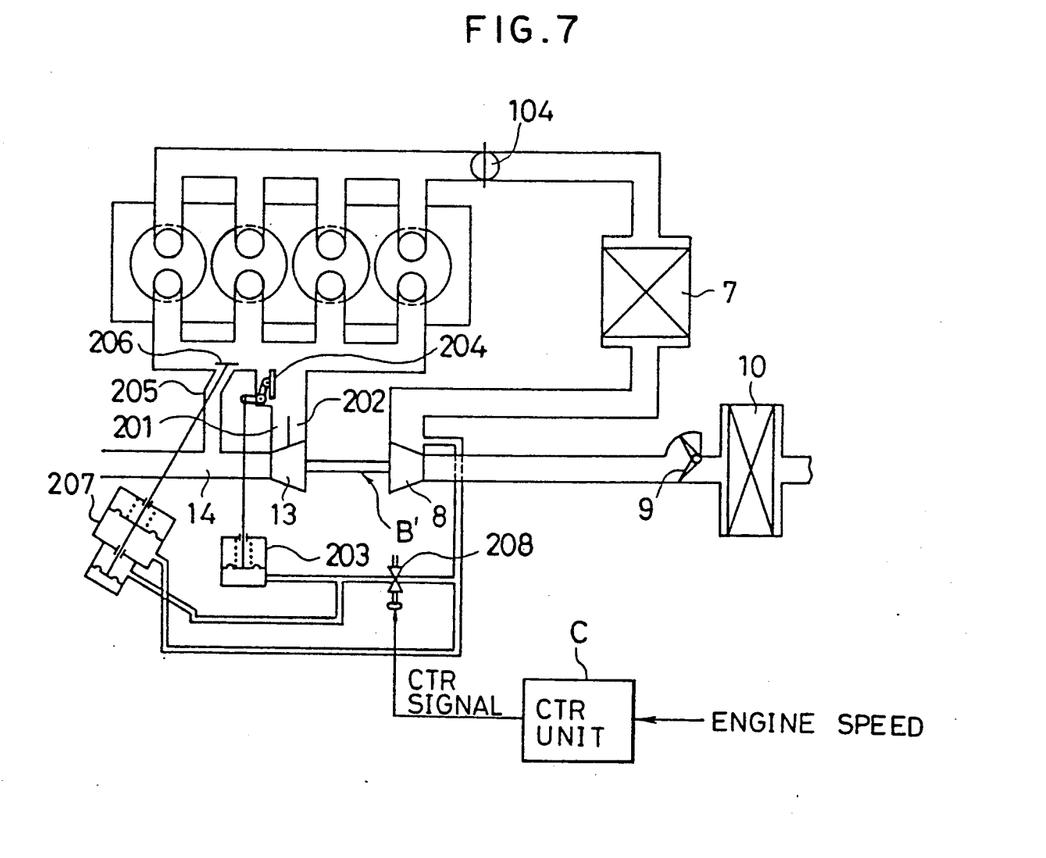
FIG. 7 is a schematic view of a four-cylinder engine with a turbo supercharger having dual intake passages to a turbine thereof in accordance with a further embodiment of the present invention.

Referring to FIG. 7, there is shown a four cylinder engine in accordance with a further preferred embodiment of the present invention. In this embodiment, a volume of the supercharger is changed, in accordance with the switching operation, between the first and second intake conditions. In other words, the amount of the exhaust gas is changed in accordance with the engine speed. The illustrated turbo supercharger B' is provided with two inlet passages 201 and 202. A gate valve 204 is provided in the inlet passage 201 for opening and closing the inlet passage 201. A bypass passage 205 is provided for bypassing the turbine 13 of the turbo supercharger B'. There is provided a waste gate valve 206 for opening and closing an upstream end portion of the bypass passage 201. In order to control the waste gate valve 206, an actuator 207 is provided. A three-way solenoid valve 208 is provided for controlling operation of the actuators 203 and 207.

In operation, when the engine speed is in a lower range, the three-way solenoid valve 208 is in a position in which the actuator 203 is released to the atmosphere so that the gate valve 204 is kept at the closed position, because of the resilient force of the spring, to close an inlet passage 201 of the turbine 13. As a result the exhaust gas is introduced into the turbine 13 through only the inlet passage 202 to increase a flowing speed thereof so that supercharging effect of the supercharger B' is increased to improve the charging efficiency in the lower engine speed condition.

When the engine speed is increased to reach a predetermined value, the three-way solenoid 208 receives a control signal from the control unit C to take the second position in which the supercharging pressure is introduced into the actuator 203. When the force caused by the supercharging pressure overcomes the resilient force of the spring in the actuator 203, the gate valve 204 is operated to be opened. As a result, the exhaust gas is introduced into the turbine 13 through not only the inlet passage 201 but also the inlet passage 202 in a higher engine speed condition. That is, the amount of exhaust gas introduced into the turbine 13 is increased to raise the output of the supercharger B' so that the charging efficiency of the intake gas is improved in the higher engine speed condition. In this case, on starting the introduction of the supercharged gas into the actuator 203, the supercharging pressure is introduced into the actuator 207 through the three-way solenoid valve 208 so that opening rate of the waste gate valve 206 is controlled to change the maximum supercharging pressure of the supercharger B7 from a lower value to a higher value. The operation of the actuator 207 of the waste valve is similar to that of the actuator 18 in FIG. 1.

According to the illustrated embodiment of the invention, the switching of the intake condition of the intake gas is carried out in response to the change of the maximum supercharging pressure controlled based on the opening of the waste gate valve 206 so that the charging efficiency of the intake gas is accomplished in the broader range of the engine speeds while suppressing knocking in the lower engine speed condition.

While the invention has been specifically described in connection with preferred embodiments thereof, it will be understood by those skilled in the art that other changes or modifications in form and details can be made without departing from the spirit and scope of the invention, and that all of these changes or modifications will fall in the scope of the invention as claimed.

What is claimed is:

1. A control system for an engine with a turbo supercharger comprising:
   first intake condition establishing means for establishing a first intake condition in which a charging efficiency of intake gas is improved in a lower engine speed condition,
   second intake condition establishing means for establishing a second intake condition in which the charging efficiency of the intake gas is improved in a higher engine speed condition,
   first switching means for switching an introduction of intake gas to the engine in accordance with engine speed between the first intake condition and the second intake condition, and
   second switching means for switching a maximum supercharging pressure of the turbo supercharger from a lower pressure to a higher pressure in response to a switching operation between the first intake condition and the second intake condition.

2. A control system as recited in claim 1, wherein the first switching means is formed by variable intake means for switching a natural frequency of an intake system of the engine to tune specific engine speeds.

3. A control system as recited in claim 2, wherein the variable intake means selectively establishes two different intake systems having different natural frequency exerting resonance effects in different engine speed ranges.

4. A control system as recited in claim 3, wherein the variable intake means comprises gate valve means for switching the intake systems.

5. A control systems as recited in claim 4, wherein the variable intake means establishes the two different intake systems by changing a length of intake passage through which the intake gas is introduced into the engine.

6. A control system as recited in claim 1, wherein the first switching means is a valve timing control means for changing opening and closing timings of intake valves.

7. A control system as recited in claim 6, wherein the second switching means comprises a waste gate valve for controlling introduction of exhaust gas to a turbine of the turbo supercharger and actuator means connected with the waste gate valve for controlling operation of the waste gate valve.

8. A control system as recited in claim 7, wherein the actuator means comprises a large cylindrical portion and a small cylindrical portion partitioned by large and small diaphragms to define first and second large chambers and first and second chambers, respectively, a spring disposed in the first large chamber for urging the large diaphragm toward the second large chamber, and a rod connected to the waste gate valve and the large and small diaphragms, the supercharging pressure being introduced into the second large chamber and the first small chamber, and the first large chamber and the second small chamber being opened to the atmosphere.

9. A control system as recited in claim 8, wherein the actuator means further comprises a three-way valve for controlling the introduction of the supercharging pressure into the second large chamber and the first small chamber.

10. A control system as recited in claim 9, wherein the supercharging pressure is introduced into only the second large chamber when the engine speed reaches a first predetermined value so that the waste gate valve is actuated to be opened and into both the first small chamber and the second large chamber when the engine speed is increased to reach a second predetermined value from the first predetermined value so that the waste gate valve is moved toward a closed position, and the waste valve is moved toward an opened position when the supercharging pressure is increased beyond a predetermined value because of difference in pressure areas between the small and large diaphragms.

11. A control system as recited in claim 6, wherein the valve timing control means comprises a cam shaft for driving the intake valves, a sleeve of a substantially H-shaped cross section incorporated into the cam shaft, the cam shaft being provided with a first portion on which cam portions are formed and a second portion connected with a pulley which is driven by a crank shaft, the first portion and second portion being formed with helical splines at first ends respectively facing to each other but oriented opposite to each other, the sleeve being formed with a pair of flange portions which are formed with a threaded opening brought into engagement with the splines.

12. A control system as recited in claim 11, wherein a relative angular relationship between the first portion and the second portion is so determined that the intake valve timing is advanced in the lower engine speed range condition.

13. A control system as recited in claim 1, wherein the first switching means comprises both variable intake means for switching a natural frequency of an intake system of the engine to tune specific engine speeds and valve timing control means for changing opening and closing timings of intake valves, the valve timing control means changing the introduction of the intake gas from the first intake condition to the second intake condition at an engine speed lower than an engine speed at which the variable intake means changes the introduction of the intake gas from the first to second intake conditions.

14. A control system as recited in claim 1, wherein the first switching means is formed by a volume changing device for changing a volume of the turbo supercharger.

* * * * *